US008270291B2

(12) United States Patent
Mizrahi et al.

(10) Patent No.: US 8,270,291 B2
(45) Date of Patent: Sep. 18, 2012

(54) PROTECTED VARIABLE DATA RATE COMMUNICATION SYSTEMS

(75) Inventors: Haggai Mizrahi, Petach-Tikva (IL); Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 377 days.

(21) Appl. No.: 12/678,520

(22) PCT Filed: Sep. 23, 2008

(86) PCT No.: PCT/IL2008/001275
§ 371 (c)(1),
(2), (4) Date: Mar. 17, 2010

(87) PCT Pub. No.: WO2009/040801
PCT Pub. Date: Apr. 2, 2009

(65) Prior Publication Data
US 2010/0214910 A1    Aug. 26, 2010

Related U.S. Application Data

(60) Provisional application No. 60/960,290, filed on Sep. 24, 2007.

(51) Int. Cl.
*G01R 31/08* (2006.01)
(52) U.S. Cl. .................................. 370/218; 370/252
(58) Field of Classification Search .................... None
See application file for complete search history.

(56) References Cited

U.S. PATENT DOCUMENTS

| | | | |
|---|---|---|---|
| 4,868,641 A | 9/1989 | Modaresse | |
| 5,367,562 A | 11/1994 | Tourbah et al. | |
| 6,728,233 B1 | 4/2004 | Park et al. | |
| 6,985,544 B2 * | 1/2006 | Matsui et al. | 375/347 |
| 7,839,952 B2 * | 11/2010 | Sofer et al. | 375/299 |
| 2002/0022468 A1 | 2/2002 | Yoon et al. | |
| 2003/0129978 A1 | 7/2003 | Akiyama et al. | |
| 2004/0073692 A1 | 4/2004 | Gentle et al. | |

(Continued)

FOREIGN PATENT DOCUMENTS

EP    0810808    12/1997

(Continued)

OTHER PUBLICATIONS

Communication Pursuant to Article 94(3) EPC Dated Jul. 11, 2011 From the European Patent Office Re. Application No. 08808074.2.

(Continued)

*Primary Examiner* — Nittaya Juntima

(57) ABSTRACT

A protected point-to-point ACM communication system including at least a first component and a second component configured to provide live functionality and backup functionality for each other, at least a first receiver and a second receiver configured to receive an ACM transmission, one or more quality detectors configured to estimate quality of the received transmission of at least the first receiver and the second receiver, wherein at least one of the quality detectors is configured to estimate the quality of the received transmission using blind detection, and a controller configured to switch the live functionality of the protected point-to-point ACM communication system from one of the first component and the second component to another of the first component and the second component, based, at least partly, on the estimated qualities of the received transmissions of at least the first receiver and the second receiver. Related apparatus and methods are also described.

21 Claims, 7 Drawing Sheets

U.S. PATENT DOCUMENTS

| | | | |
|---|---|---|---|
| 2004/0165526 A1 | 8/2004 | Yada et al. |
| 2004/0228326 A1 | 11/2004 | Pearson |
| 2005/0137857 A1 | 6/2005 | Greer |
| 2006/0062242 A1 | 3/2006 | Dacosta |
| 2008/0002581 A1 | 1/2008 | Gorsetman et al. |

FOREIGN PATENT DOCUMENTS

| | | |
|---|---|---|
| WO | WO 99/21362 | 4/1999 |
| WO | WO 00/04728 | 1/2000 |
| WO | WO 2009/040799 | 4/2009 |
| WO | WO 2009/040800 | 4/2009 |
| WO | WO 2009/040801 | 4/2009 |

OTHER PUBLICATIONS

Communication Pursuant to Article 94(3) EPC Dated Sep. 8, 2010 From the European Patent Office Re. Application No. 08808074.2.

Communication Pursuant to Article 94(3) EPC Dated Sep. 8, 2010 From the European Patent Office Re. Application No. 08808075.9.

Official Action Dated May 8, 2012 From the US Patent and Trademark Office Re. U.S. Appl. No. 12/678,515.

Response Dated Feb. 2, 2011 to Communication Pursuant to Article 94(3) EPC of Sep. 8, 2010 From the European Patent Office Re. Application No. 08808075.9.

Communication Under Rule 71(3) EPC Dated Nov. 15, 2011 From the European Patent Office Re. Application No. 08808075.9.

International Preliminary Report on Patentability Dated Apr. 1, 2010 From the International Bureau of WIPO Re.: Application No. PCT/IL2008/001273.

International Preliminary Report on Patentability Dated Apr. 1, 2010 From the International Bureau of WIPO Re.: Application No. PCT/IL2008/001274.

International Preliminary Report on Patentability Dated Apr. 1, 2010 From the International Bureau of WIPO Re.: Application No. PCT/IL2008/001275.

International Search Report Dated Apr. 6, 2009 From the International Searching Authority Re.: Application No. PCT/IL2008/001275.

International Search Report Dated Feb. 17, 2009 From the International Searching Authority Re.: Application No. PCT/IL2008/001273.

International Search Report Dated Feb. 18, 2009 From the International Searching Authority Re.: Application No. PCT/IL2008/001274.

Response Dated Feb. 9, 2010 to International Search Report and the Written Opinion of Apr. 6, 2009 From the International Searching Authority Re.: Application No. PCT/IL2008/001275.

Response Dated Feb. 9, 2010 to the Written Opinion of Feb. 18, 2009 From the International Searching Authority Re.: Application No. PCT/IL2008/001274.

Written Opinion Dated Apr. 6, 2009 From the International Searching Authority Re.: Application No. PCT/IL2008/001275.

Written Opinion Dated Feb. 17, 2009 From the International Searching Authority Re.: Application No. PCT/IL2008/001273.

Written Opinion Dated Feb. 18, 2009 From the International Searching Authority Re.: Application No. PCT/IL2008/001274.

Communication Pursuant to Article 94(3) EPC Dated Apr. 18, 2011 From the European Patent Office Re. Application No. 08808075.9.

Response Dated Mar. 3, 2011 to Communication Pursuant to Article 94(3) EPC of Sep. 8, 2010 From the European Patent Office Re. Application No. 08808074.2.

Official Action Dated Nov. 21, 2011 From the US Patent and Trademark Office Re. U.S. Appl. No. 12/678,527.

* cited by examiner

PROTECTED VARIABLE DATA RATE COMMUNICATION SYSTEMS

RELATED APPLICATIONS

This Application is a National Phase of PCT Patent Application No. PCT/IL2008/001275 having International filing date of Sep. 23, 2008, which claims the benefit of U.S. Provisional Patent Application No. 60/960,290 filed on Sep. 24, 2007. The contents of the above Applications are all incorporated herein by reference.

FIELD OF THE INVENTION

The present invention, in some exemplary embodiments thereof, relates to a redundancy mechanism for maintaining continuity of communication over a wireless point-to-point communication link through changing propagation conditions, and, more particularly, a mechanism for deciding when to switch between redundant communications systems. Even more particularly, but not exclusively, the present invention relates to variable data rate communication systems such as Adaptive Coding and Modulation (ACM) communication systems.

BACKGROUND OF THE INVENTION

Wireless communication links are known to be sensitive to time-varying propagation conditions. Multiple propagation paths with different attenuation and delay characteristics produce an effect known as fading. Fading in millimeter wave communication links may also be caused by rain attenuation. In some communication links, co-channel and adjacent-channel signals introduce interference which degrades the quality of a received signal. These phenomena, which are time-varying, reduce the Signal to Noise Ratio (SNR) obtained at a receiver output.

A mathematical measure of the data rate which may be transmitted over a given channel with a given, arbitrarily low, error probability is the channel capacity. The channel capacity is proportional to a logarithm of channel SNR. An SNR increment of 3 dB enables increasing a data rate by approximately 1 bit per Hz. Some modern communication systems try to maximize their data rate by transmitting at a data rate which tracks the channel capacity. For such a purpose a communication channel SNR estimator is typically included. The modulation type and coding rate of the communication system are typically selected from a predetermined set according to an estimated SNR and possibly to adaptive SNR threshold levels. Such systems will be referred to herein as Adaptive Coding and Modulation (ACM) systems.

Typical operation of an ACM system is as follows. A receiver estimates the channel SNR or some other indication of communication quality. If the estimate of the quality is sufficiently high such that upgrading of the communication rate is possible, a request for an appropriate coding/modulation scheme is sent to the transmitter on a return link. A protocol for scheduling the modulation/coding switch should attempt to provide an errorless transition to the new modulation. A similar procedure takes place when communication quality gets dangerously close to a threshold of operation in which intolerable errors may occur. In such a case, transmission switches to a lower communication rate.

For fast fading channels it is desirable that the SNR be measured with high accuracy and with a low delay. Typically the measurement is done in a decision directed manner. A Mean Squared Error (MSE) of the signal at the demodulator output is calculated via hard decisions regarding the transmitted symbols. The MSE may then be transformed into an estimate of the SNR.

Occasionally, despite efforts made by a system to track the channel capacity, a selected modulation scheme is too large, that is, has too many bits per symbol for the channel to handle. Whichever is a weakest point of the receiver is a first point to break down. In millimeter-wave communication systems, the weak point is typically a carrier phase tracking mechanism. As a result, demodulator output also breaks down, and an estimated MSE indicates an SNR significantly worse than actual SNR. Such a system typically responds by switching to a very low bit rate, sometimes lower than necessary, thereby wasting bandwidth.

The disclosures of all references mentioned above and throughout the present specification, as well as the disclosures of all references mentioned in those references, are hereby incorporated herein by reference.

SUMMARY OF THE INVENTION

The present invention, in some exemplary embodiments thereof, seeks to provide a redundancy mechanism for maintaining continuity of communication over a wireless communication link through changing propagation conditions.

In protected wireless point-to-point communication links, in order to maintain continuity of communication, essential components of the communication system, such as a transmitter and a receiver, are provided in duplicate. Both duplicates of the communication system are kept on. A first system provides a live transmission, while a second system operates in parallel as backup, but is kept mute, that is, the output of the second system is not used unless there is a need to switch over to the second system. The second system can also be switched to if the first system is degrading below a quality which can be supplied by the second system.

It is to be appreciated that wherever two duplicates are discussed in the present specification and claims, more than two duplicates can be used. Describing two duplicates components of a system, or two duplicates of a system, is to be understood as extended similarly to more than two duplicates.

When several duplicate components of a system or several duplicates of a system are used, often all but one of the duplicates are used for live transmission, and one is kept operational for backup. Such a setup is termed "N+1", with N live components or systems, and one backup component or system.

In exemplary embodiments of the present invention, protection controller for a point-to-point communication link monitors the first and the second system, and decides when it is appropriate to switch from the first system to the second system.

It is to be appreciated that the duplicate components can be provided of any key system component. The description in the present specification and specs is written with example duplicate components being receivers and transmitters. Persons ordinarily skilled in the art, having understood the present invention with reference to receivers and transmitters, are able to implement the mechanism of the present invention for other duplicate components.

In exemplary embodiments of the present invention, a second, backup, system is often connected in such a way as to receive a lower signal level than the first system. Often the first receiver receives most of the available signal power. The asymmetry between the first receiver and the second receiver, in conjunction with the fact the when ACM is activated, excess SNR is traded for increased bit rate, often causes the second receiver to be in a state in which it is unable to track a carrier phase. It is desired to verify in such a case that the second receiver is operational without being actually able to directly calculate the MSE.

It is to be appreciated that exactly equal splitting of a received signal power may be generally difficult to achieve. For example, losses in cables and connectors, as well as unequal noise floor of amplifiers, result in two receivers which have different thresholds. In ACM, a typical change of coding and modulation can cause, by way of a non-limiting example, a 3 dB change in received power. When one receiver is locked onto a signal and receiving well enough to directly calculate the MSE, a second receiver, due to an asymmetry of only 3 dB, can be operational without being actually able to directly calculate the MSE. Changes in received power smaller than 3 dB can produce more instances of the above-mentioned asymmetry.

Therefore, exemplary embodiments of the present invention which may be configured for asymmetric systems, with asymmetry as defined above, are applicable also for systems which were meant to have equal splitting, and which are nevertheless not strictly equal.

In case of a communication loss between an ingress point and an egress point, a protected point-to-point wireless system needs to distinguish between at least three alternatives and react accordingly. Three of the alternatives are: transmitter failure, receiver failure and loss of communication due to degradation in the link capacity. In an ACM scheme, the loss of communication would happen if the degradation in the link capacity was fast, and not tracked by an ACM mechanism suitably changing the coding/modulation scheme. The distinguishing is further complicated by the fact that the second system is often designed to receive less signal power, and therefore can be in a state in which a demodulator within the second receiver is unlocked when the second receiver is in standby mode.

It is therefore to be appreciated that protected point-to-point ACM communication systems which operate at limits of their bandwidth often operate in situations where conventional, decision directed, measurements of quality of a received transmission break down.

The above alternatives refer to a point-to-point wireless system which transmits over a single wireless link, using a second system which transmits over the same wireless link. It is to be appreciated that the second system may also use a separate wireless link. For example, the first system may have a wireless link between point A and point B, and the second system may have a wireless link between point A and point C, with a wired connection from point C to Point B, thereby providing a backup for the wireless link from A to B. Other such geometric possibilities are also envisaged.

According to one aspect of the present invention there is provided a protected point-to-point ACM communication system including at least a first component and a second component configured to provide live functionality and backup functionality for each other, at least a first receiver and a second receiver configured to receive an ACM transmission, one or more quality detectors configured to estimate quality of the received transmission of at least the first receiver and the second receiver, wherein at least one of the quality detectors is configured to estimate the quality of the received transmission using blind detection, and a controller configured to switch the live functionality of the protected point-to-point ACM communication system from one of the first component and the second component to another of the first component and the second component, based, at least partly, on the estimated qualities of the received transmissions of at least the first receiver and the second receiver.

Optionally, the blind detection includes a non-decision-directed mechanism.

Optionally, the estimated quality is a binary value.

Optionally, the estimated quality is a multi-level value.

Optionally, at least one of the one or more quality detectors is configured to estimate quality based, at least partly, on the received transmission magnitude.

Optionally, at least one of the one or more quality detectors is configured to estimate quality of the received transmission when a demodulator included in the receiver is not phase locked to the transmission received by the receiver.

Optionally, the first component and the second component are receivers.

Optionally, at least one of the one or more quality detectors is configured to estimate quality by performing valid signal detection on the received transmission.

Optionally, at least one quality detector is configured to estimate quality by performing preamble detection on the received transmission.

Optionally, the first component and the second component are transmitters.

Optionally, the first component is the first receiver, and the second component is the second receiver.

Optionally further including a first transmitter and a second transmitter configured to provide live functionality and backup functionality for each other, and wherein the controller is configured to switch the live functionality of the protected point-to-point ACM communication system from one of the first receiver and the second receiver to another of the first receiver and the second receiver, and from one of the first transmitter and the second transmitter to another of the first transmitter and the second transmitter, based, at least partly, on the estimated qualities of the received transmissions of at least the first receiver and the second receiver Optionally, the controller is configured to switch the live functionality of the wireless point-to-point communication system to the first component whenever the result does not indicate that use of the second component is necessary.

Optionally, the controller is configured to switch the live functionality of the wireless point-to-point communication system from one of the first component and the second component to another, based, at least partly, on the estimated qualities of the received transmissions of at least the first receiver and the second receiver indicating that the switch will be from a component providing less quality to a component providing more quality.

Optionally, the protected ACM communication system includes at least one transmitter, a first receiver, and a second receiver, at least one of the quality detectors is configured to estimate quality of the functionality of at least the first receiver and the second receiver in a decision directed manner, and an ACM coding/modulation scheme of a live one of the at least one transmitter is based, at least partly, on an indication of quality estimated for a one of the first receiver and the second receiver which has a lower Signal to Noise Ratio (SNR).

According to another aspect of the present invention there is provided a method for protecting a point-to-point ACM communication system including providing at least a first component and a second component configured to provide live functionality and backup functionality for each other, receiving an ACM transmission by at least a first receiver and a second receiver, estimating quality of a received transmission of at least the first component and the second component, wherein the estimating the quality of the received transmission of at least one of the receivers is performed using blind detection, and switching the live functionality of the point-to-point ACM communication system from one of the first component and the second component to another of the first component and the second component, based, at least partly, on the estimated qualities of the received transmissions of at least the first receiver and the second receiver.

According to yet another aspect of the present invention there is provided a protected point-to-point ACM communication system including at least a first component and a second component configured to provide live functionality and backup functionality for each other in a wireless point-to-point communication system, at least a first receiver and a second receiver configured to receive an ACM transmission, means for estimating quality of the received transmission of at least the first receiver and the second receiver, and means for switching the live functionality of the wireless point-to-point communication system from one of the first component and the second component to another of the first component and the second component, based, at least partly, on the estimated qualities of the received transmissions of at least the first component and the second component.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of exemplary methods and systems of the present invention involve performing or completing certain selected tasks or steps manually, automatically, or a combination thereof. Moreover, according to actual instrumentation and equipment of exemplary embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of exemplary embodiments of the invention could be described as being performed by a data processor, such as a computing platform for executing a plurality of instructions.

BRIEF DESCRIPTION OF THE DRAWINGS

The invention, in some exemplary embodiments thereof, is herein described, by way of example only, with reference to the accompanying drawings. With specific reference now to the drawings in detail, it is stressed that the particulars shown are by way of example and for purposes of illustrative discussion of exemplary embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF PREFERRED EMBODIMENTS

Figure 1:
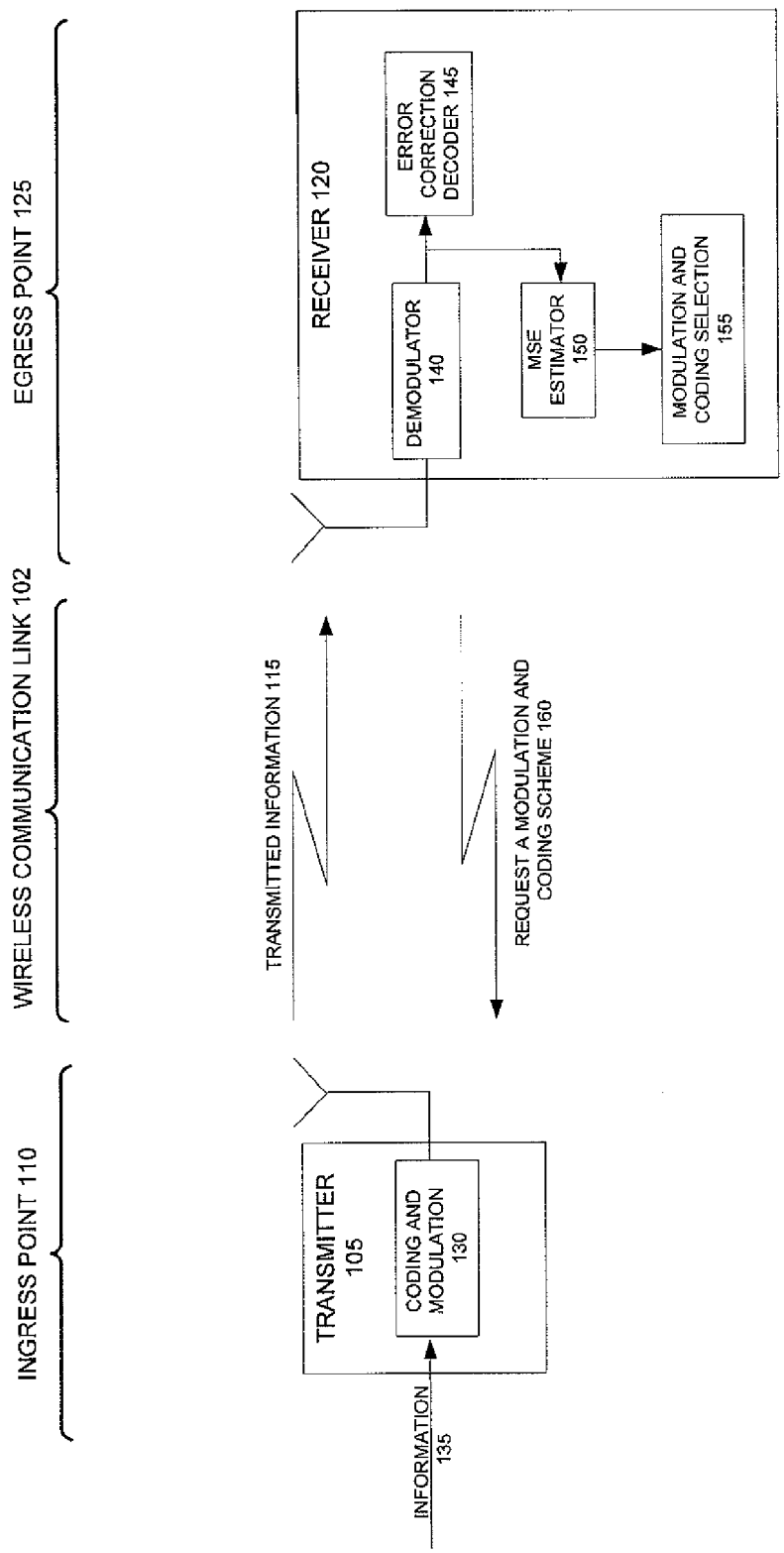
FIG. 1 is a simplified block diagram of a prior art ACM transmitter-receiver pair.

The present embodiments comprise an apparatus and a method for providing a redundancy mechanism for maintaining continuity of communication over a wireless communication link through changing propagation conditions.

The principles and operation of an apparatus and method according to some exemplary embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as necessarily limiting.

Reference is now made to FIG. 1, which is a simplified block diagram of a prior art ACM transmitter-receiver pair.

The transmitter-receiver pair is depicted as paired on opposite sides of a point-to-point wireless communication link 102. The transmitter 105 is at an ingress point 110 of the point-to-point communication link, and transmits information 115 to the receiver 120 at an egress point 125 of the point-to-point communication link.

The transmitter 105 has a coding and modulation unit 130 which codes and modulates incoming information 135, and transmits the result over the wireless communication link 102 as the transmitted information 115.

The receiver 120 receives the transmitted information 115, and demodulates the transmitted information 115 using a demodulator 140. The demodulator outputs demodulated data to an error correction decoder 145, for eventual onward propagation, and to an MSE estimator 150, for estimating quality of the transmission.

A Mean Squared Error (MSE) of the output of the demodulator 140 is calculated via hard decisions regarding the transmitted symbols.

The MSE estimator 150 provides an output to a modulation and coding selection unit 155, which selects a modulation and coding scheme to be used for transmission, based on input provided by the MSE estimator 150.

The receiver 120 transmits a request for a modulation and coding scheme 160 based on the selection made by the modulation and coding selection unit 155, back over the wireless communication link to the transmitter 105.

It is to be appreciated by persons skilled in the art that point-to-point communication may be two way communication, in which the ingress point 110 also has a receiver, and the egress point 125 also has a transmitter.

Some wireless point-to-point communication systems require a protection mechanism. The mechanism aims at protecting the system from hardware failures. Backup equipment is connected in parallel with the main equipment. In the event of a main receiver being unable to provide the transmitted information due to a hardware failure it is necessary to switch to the backup receiver.

Figure 2A:
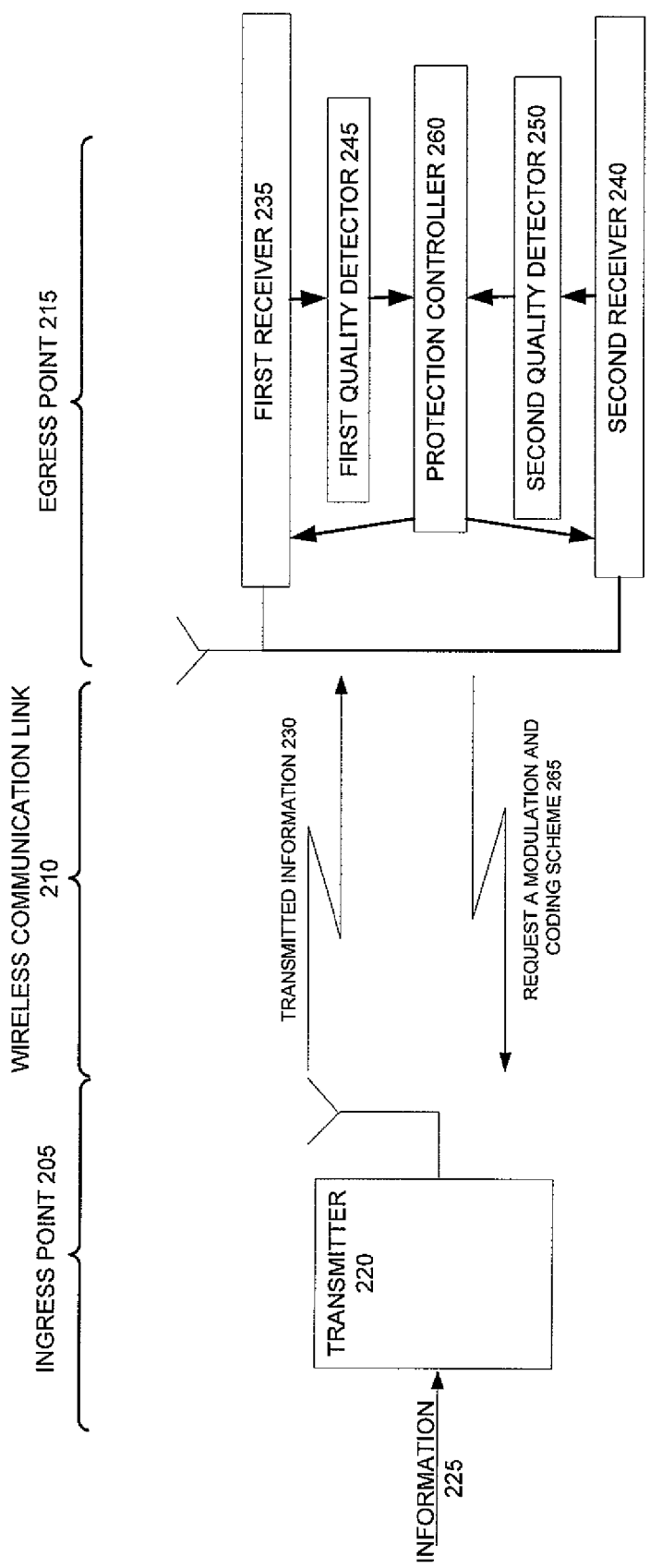
FIG. 2A is a simplified block diagram of a protected point-to-point ACM communication system constructed and operative in accordance with an exemplary embodiment of the present invention.

Reference is now made to FIG. 2A, which is a simplified block diagram of a protected point-to-point ACM communication system constructed and operative in accordance with an exemplary embodiment of the present invention.

The protected point-to-point ACM communication system has an ingress point 205, connected by a wireless link 210 to an egress point 215.

The ingress point 205 comprises a transmitter 220, which accepts information 225, codes and modulates the information as described above with reference to FIG. 1, and transmits the coded and modulated information as transmitted information 230.

The transmitted information 230 is received, at the egress point 215, by a first receiver 235 and a second receiver 240. Both the first receiver 235 and the second receiver 240 attempt to demodulate and decode the transmitted information 230, and to produce received information. Not always will both receivers 235 and 240 succeed, as will be described below.

One of the first receiver 235 and the second receiver 240 is a live receiver, which provides the received information for output (not shown) and propagation. The other of the first receiver 235 and the second receiver 240 is a backup receiver, which produces the received information, but does not provide the received information as output for propagation.

The first receiver 235 is connected to a first quality detector 245, and the second receiver 240 is connected to a second quality detector 250. The quality detectors 245 250 estimate quality of the received information, and provide their estimates as output to a protection controller 260.

The protection controller 260, based on the estimated quality provided by the first quality detector 245 and the second quality detector 250, provides control signals to the first receiver 235 and to the second receiver 240, thereby controlling which of the receivers 235 240 is a live receiver and which is a backup receiver. The protection controller 260 can switch the live functionality between the first receiver 235 and the second receiver 240, and does so based on the estimated qualities of the received information provided by the quality detectors 245 250, and on a suitable method programmed therein for deciding when to switch.

The egress point 215 also selects a modulation and coding scheme to be used for transmission. One of the receivers 235 240 transmits a request for a modulation and coding scheme 265 back over the wireless communication link to the transmitter 105.

It is to be appreciated by persons skilled in the art that point-to-point communication may be two way communication, in which the ingress point 205 also has one or more receivers, and the egress point 215 also has one or more transmitters.

In some exemplary embodiments of the present invention, a signal carrying the transmitted information 230 is split equally between the first receiver 235 and the second receiver 240, that is, received power is split equally. The received power suffers attenuation of 3 dB to each of the first receiver 235 and the second receiver 240 by being split equally between them. According to a definition of decibel:

$$L_{dB} = 10\log_{10}\left(\frac{P_1}{P_0}\right)$$

When P0 is divided into two equal parts of $P_1=P_0/2$, dividing the received power equally causes an attenuation of 3 dB.

In some exemplary embodiments of the present invention, the second receiver acts as a backup receiver, and is connected in such a way as to receive a lower signal level. When transmitting at a maximal capacity for existing conditions, the first receiver should receive most of an available signal power. Such an asymmetric configuration, in conjunction with the fact that when ACM is activated, excess SNR is traded for increased bit rate, may cause a second receiver to be in a state in which it is unable to track a carrier phase. It is necessary to verify in such a case that the second receiver is operational without being actually able to directly calculate a MSE.

In fact, equal splitting of a received signal power may generally not be possible. Unequal losses in cables and connectors, as well as an unequal noise floor of the first and the second receiver amplifiers produce a situation where two receivers have different thresholds.

In case of a communication loss between a receiver and a transmitter, an exemplary embodiment of the present invention has to detect and distinguish between at least three alternatives, and act accordingly. Three of the alternatives are transmitter failure; receiver failure; and loss of communication due to a fast degradation in the link capacity which was not tracked by the ACM mechanism. Detecting a degradation in link capacity is further complicated by the fact that a second receiver may be designed to operate, in standby mode, in a condition in which a demodulator is unlocked.

In order to estimate quality of a signal which has an SNR below detection threshold, it is possible for a live system to select a coding and modulation scheme in such a way that both receivers are always above threshold.

In one exemplary embodiment of the present invention a modulation and coding scheme to be used for transmission is selected based on transmission quality estimated by one of the quality detectors 245 250 which is connected to the second receiver 240, the second receiver 240 being the receiver receiving a less powerful signal.

In another exemplary embodiment of the present invention a modulation and coding scheme to be used for transmission is selected based on transmission quality estimated by one of the quality detectors 245 250 which is connected to a live one of the receivers 235 240.

When a modulation and coding scheme to be used for transmission is selected based on reception quality of the second receiver 240, the transmission is often degraded, compared to a modulation and coding scheme based on reception quality of the first receiver 235. In order to avoid this shortcoming, some exemplary embodiments of the present invention use blind quality estimation by signal quality detectors.

In some embodiments of the invention, the first quality detector 245 and/or the second quality detector 250 use Non Data Aided (NDA) methods, also termed blind methods, for estimating signal quality, optionally by estimating a Signal to Noise Ratio (SNR). Such methods are not based on making decisions regarding the transmitted symbols, or on decoding transmitted symbols, and do not require a receiver to be phase locked. Such methods are well suited for use in low SNR situations.

In a communication system which sends coded symbols, there is an expected distribution of received signal magnitudes. Some embodiments of the invention using blind SNR estimation are based on having an expectation of a Probability Distribution Function (PDF), or envelope, of magnitudes of received symbols, and measuring a deviation from the expected PDF.

It is noted that measuring a deviation from the expected magnitude distribution can be done by a receiver which receives a low quality signal which does not enable phase-locking and/or does not enable a data aided approach to SNR estimation.

Example embodiments of the SNR estimation are optionally based on a magnitude distribution of the set of samples and are therefore insensitive to carrier signal phase. A receiver making the estimation using the example embodiment is not dependent on being phase-locked to the carrier signal phase.

Figure 2B:
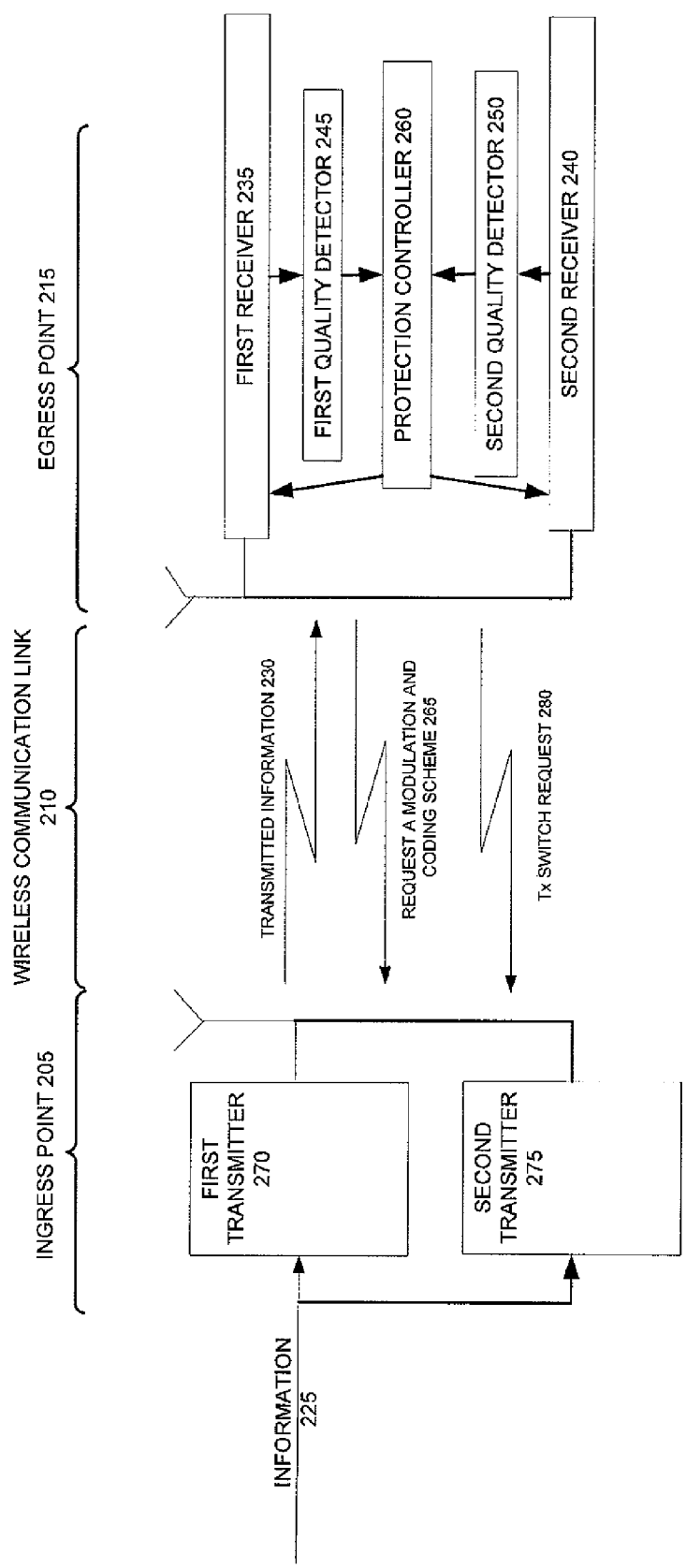
FIG. 2B is a simplified block diagram of an alternative exemplary embodiment of the system of FIG. 2A.

Reference is now made to FIG. 2B, which is a simplified block diagram of an alternative exemplary embodiment of the system of FIG. 2A. The system of FIG. 2B comprises the components described above with reference to the system of FIG. 2A, with the differences described below.

The ingress point 205 comprises two transmitters: a first transmitter 270 and a second transmitter 275. The information 225 input into the ingress point 205 is provided to both of the transmitters 270 275. One of the transmitters 270 275 functions as a live transmitters, while another of the transmitters 270 275 functions as a standby or as a backup transmitter. Either one of the transmitters can provide the transmitted information 230 for transmission to the egress point 215, but only one of the transmitters 270 275 does so at a time.

The protection controller 260, based on the estimated quality provided by the first quality detector 245 and the second quality detector 250, provides control signals to the first receiver 235 and to the second receiver 240, thereby controlling which of the receivers 235 240 is a live receiver and which is a backup receiver, as described above with reference to FIG. 2A.

If the protection controller 260 detects a problem with a currently live transmitter, the protection controller 260 may also send a transmission (Tx) switch request 280 for switching transmission functionality from a currently live transmitter to a backup transmitter, such as, by way of a non-limiting example, from the first transmitter 270 to the second transmitter 275. If the problem with the transmitter persists, the protection controller 260 may request to switch transmitters again after a time-out period.

Detecting ingress point transmitter problems by receivers at the egress side is described below in more detail with reference to FIGS. 4, 5, and 6.

In addition to detecting ingress point transmitter problems by receivers at the egress side, persons skilled in the art will appreciate that ingress point transmitter problems can be sometimes be detected at the ingress side, before transmission.

Figure 3:
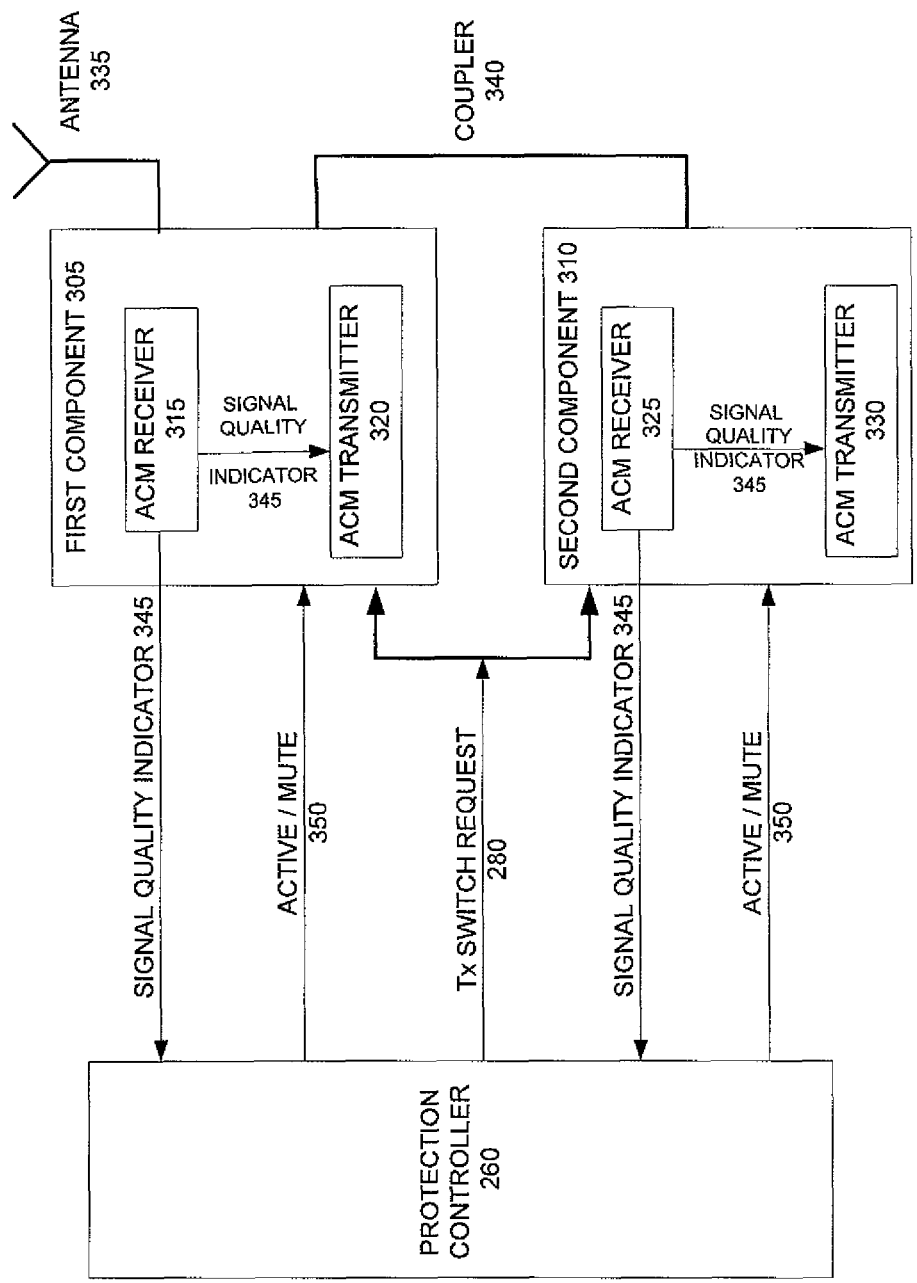
FIG. 3 is a simplified block diagram of an egress point of another alternative exemplary embodiment of the system of FIG. 2A.

Reference is now made to FIG. 3, which is a simplified block diagram of an egress point of another alternative exemplary embodiment of the system of FIG. 2A.

The egress point of a protected point-to-point ACM communication system of FIG. 3 comprises a first component 305 and a second component 310.

The first component 305 comprises an ACM receiver 315, and an ACM transmitter 320. The second component 310 comprises an ACM receiver 325, and an ACM transmitter 330.

The egress point of a point-to-point ACM communication link comprises the ACM receivers for receiving transmissions, and the ACM transmitters for transmitting back to the ingress point (FIGS. 1, 2A, and 2B), at least requests for modulation and coding schemes, as described with reference to FIGS. 1 and 2A. It is to be appreciated that the point-to-point ACM communication link is typically bi-directional, and that the ACM transmitters typically transmit payload data, and not only requests for a modulation and coding scheme.

The first component 305 comprises an antenna 335. The second component 310 and the first component 305 are coupled by a coupler 340 which connects the second component 310 to the first component 305, and provides functionality of the antenna 335 to the second component 310.

Each of the ACM receivers 315 325 comprises a quality detector (not shown), which sends a signal quality indicator 345 to the ACM transmitters 320 330, to be used for sending requests for modulation and coding schemes to the ingress point (FIGS. 1, 2A, and 2B). The signal quality indicators 345 are also sent to the protection controller 260, to be used as a basis, or at least a partial basis, for determining which of the first component 305 and to the second component 310 shall be active.

The protection controller 260 optionally sends active-or-mute signals, when required, to the first component 305 and to the second component 310, to control which of the first component 305 and to the second component 310 shall be active, and which shall be mute.

The protection controller 260 can also determine that there is a need to switch between a live transmitter and a backup, mute, transmitter, as was described above with reference to FIG. 2B, and will be described below with reference to FIGS. 4, 5, and 6. The protection controller 260 can send the Tx switch request 280 to a first transmitter 270 (FIG. 2B) and a second transmitter 275 (FIG. 2B) via a live one of the ACM transmitters 320 330, or the protection controller 260 can send such a signal via other means.

Alternative exemplary embodiments of the present invention use alternative mechanisms for determining a quality of reception at a backup receiver, and alternative actions which are taken in order to restore or improve a communication link.

Blind Quality Detectors

As discussed above, in an ACM communication system with unequal splitting of a received signal power, a non-decision-directed mechanism for determining the state of the second system, and possibly of the first system, is sometimes needed.

Alternative exemplary embodiments of the present invention implement two categories of quality detectors: binary and non-binary. Binary quality detectors provide a binary value indicating if a quality of the received signal is above a threshold level or not.

An alternative exemplary embodiment of the present invention implements a binary quality detector by using a Valid Signal Detector (VSD) as follows:

The VSD determines whether a received signal is simply a white Gaussian noise, or whether the received signal is a modulated signal such as, by way of a non-limiting example, a QAM signal, without actually demodulating the received QAM signal. The demodulator of the receiver is assumed to be time synchronized to the transmitted QAM signal. The assumption is often valid even at SNR values below a threshold at which other functions fail in a typical demodulator. The received QAM signal, which is time synchronized, is sampled at a rate of two samples per symbol, and filtered by a conventional matched filter. A result of the sampling and filtering is distinguished from white Gaussian noise as follows: the result samples are split into pairs of odd and even sample sets. Since in QAM signals there is some correlation between consecutive samples in one of the sets, and in white Gaussian noise there is no correlation, by calculating these correlations it is easy to detect whether a QAM signal is being received.

Yet another alternative exemplary embodiment of the present invention implements a binary quality detector by using a Preamble Detector (PD) as follows:

Often a predetermined sequence of symbols is inserted periodically into the transmitted stream. Such a sequence is termed in the art a preamble sequence or a synchronization sequence. The sequence can be detected by means of auto-correlation of the received signal. If a carrier phase and a carrier frequency are not synchronized, a correlation function which takes into account only magnitude of the received signal is employed. If the carrier frequency offset is small, that is, a small rotation is accumulated during the preamble sequence, phase differences between consecutive samples are used for the correlation. Detection of an auto-correlation above a certain threshold indicates that a valid signal is being received.

Still other alternative exemplary embodiment of the present invention can be adapted for using other examples of binary detectors, such as can be proposed by persons skilled in the art.

Non-binary detectors produce multi-level information about the quality of a received signal, as opposed to binary information, or two-level, information. The multi-level information is sometimes referred to as soft information, as opposed to hard information associated with binary detectors.

An alternative exemplary embodiment of the present invention implements a non-binary quality detector by using a blind SNR estimator for detecting a valid received signal. The blind SNR estimator estimates MSE based on a received magnitude, and does not require carrier phase synchronization. The blind SNR estimator is optionally used when phase synchronization is a weak point in a demodulator.

Protection Controller

A task of a protection controller (FIGS. 2A, 2B, and 3) is to determine, according to signal quality indications, which of a first system and a second system should be live and which should be mute. Additionally, the protection controller can be required to signal a remote terminal to switch its transmitter.

For the non binary detectors a threshold quality value is defined. A quality of a first system or component is denoted as $Q_{First}$, and a quality of a second system or component is denoted by $Q_{Second}$. The threshold quality value is denoted by $Q_{Thr}$.

For binary detectors, the threshold quality value is inherent to the binary detectors. Thus, a determination of a signal quality relative to a threshold quality is made by the binary detector.

Figure 4:
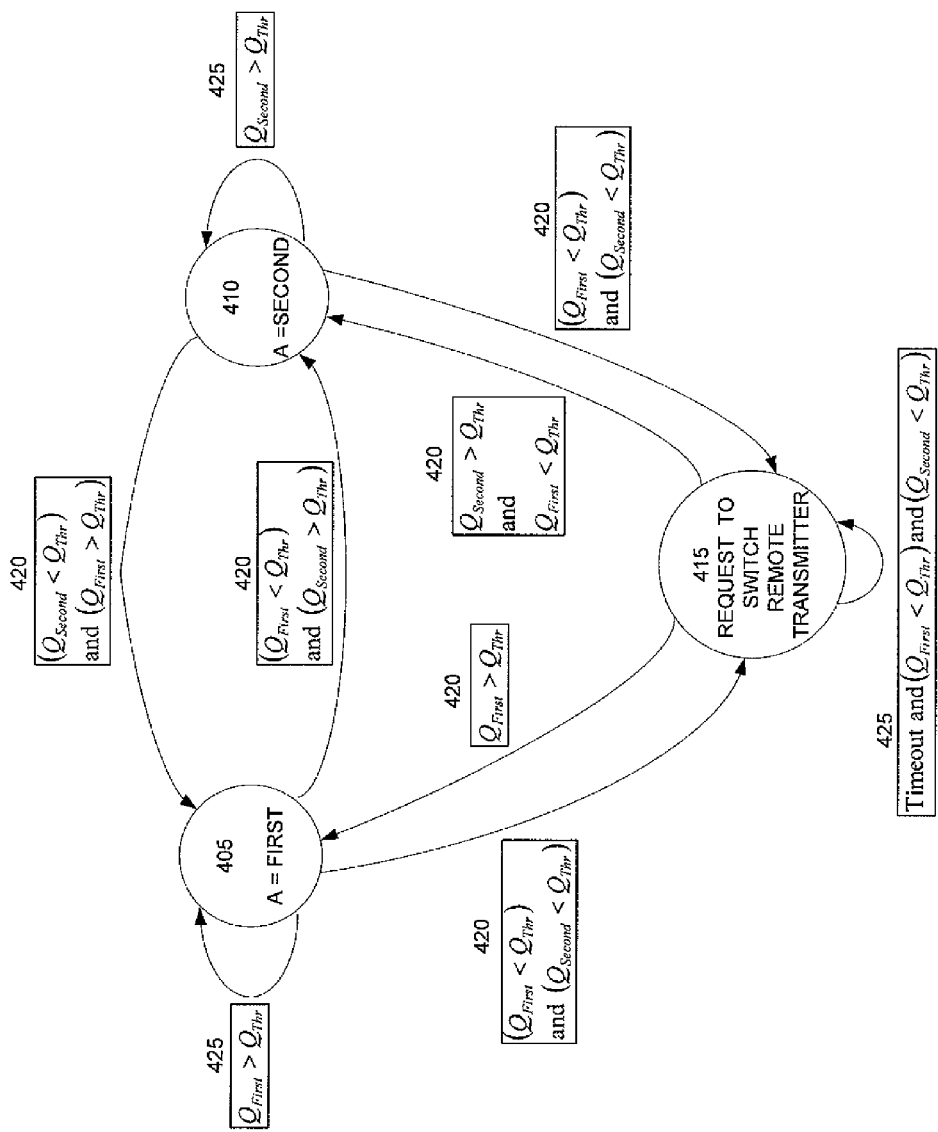
FIG. 4 is a state diagram of a protection controller in an exemplary embodiment of the system of FIG. 2A.

Reference is now made to FIG. 4, which is a state diagram of a protection controller in an exemplary embodiment of the system of FIG. 2A.

In a first state 405, a first receiver is live. The currently live receiver is denoted by A=First or A=Second. In a second state 410, a second receiver is live. A third state 415 occurs when there is a need to request a remote transmitter to switch transmitter based on a received signal quality.

Transitions between the states 405 410 415 are depicted by arrows, which connect the states 405 410 415. Boxes 420 next to each arrow denote which condition causes a transition from one state to another along the arrow.

Arrows also connect each of the states 405 410 415 to itself, and boxes 425 next to each arrow denote under which conditions a state continues to be maintained.

In light of the descriptions above, made in the Summary of the Invention, and with reference to FIGS. 2A and 3, it is believed that conditions for transitions to the first state 405 and to the second state 410 are obvious.

Additionally, conditions for remaining at a first state 405 or a second state 410 exist as long as the first receiver is above the quality threshold, or the second receiver is above the quality threshold.

A transition to the third state 415, requesting a remote transmitter to switch transmitter based on a received signal quality, is made when both the first receiver and the second receiver detect signal quality below $Q_{Thr}$. In such a case suspicion falls on a transmitter problem, and a request should be made to a live transmitter to switch to a standby transmitter.

In an alternative exemplary embodiment of the present invention, the protection controller (FIGS. 2A, 2B, and 3) provides a higher priority to the first receiver. The protection controller switches to the first receiver whenever possible.

Figure 5:
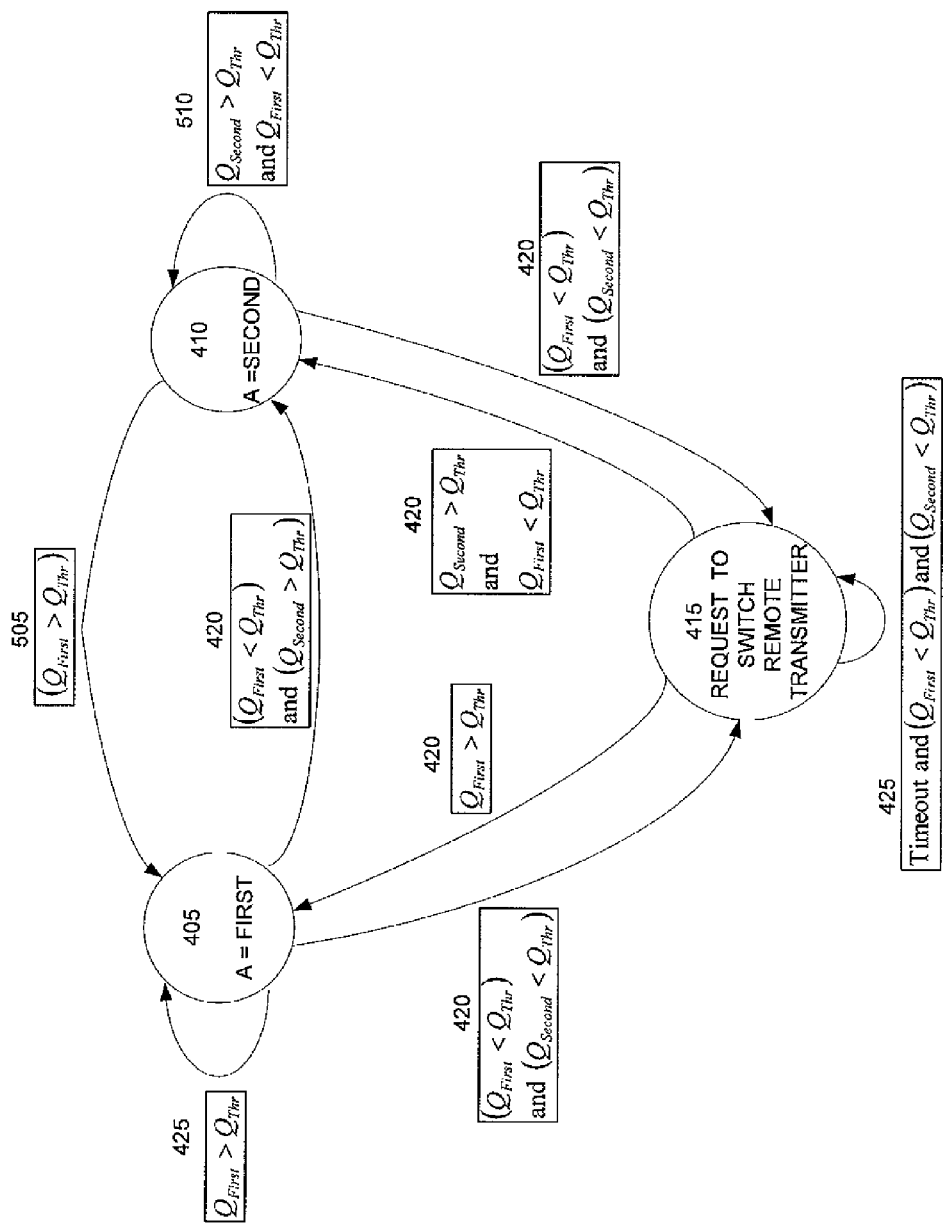
FIG. 5 is a state diagram of a protection controller in yet another alternative exemplary embodiment of the system of FIG. 2A, providing a higher priority to a first receiver.

Reference is now made to FIG. 5, which is a state diagram of a protection controller in yet another alternative exemplary embodiment of the system of FIG. 2A, providing a higher priority to a first receiver.

The state diagram of FIG. 5 is similar to the state diagram of FIG. 4, with the following changes, which are hereby described.

A transition 505 from the second receiver to the first receiver is made as soon as the first receiver has a quality $Q_{first}$ above the threshold quality $Q_{thr}$, regardless of the quality of the second receiver $Q_{Second}$.

State 410 of having a live second receiver is maintained, as denoted by a condition 510, as long as both the second receiver has a quality $Q_{Second}$ above the threshold quality $Q_{thr}$, and the first receiver has a quality $Q_{first}$ below the threshold quality $Q_{thr}$.

A protection controller as described in FIG. 5 switches to the first receiver, even when there is no actual gain in performance, that is, when the second receiver is capable of providing a communication rate above the threshold, and when a SNR difference between the first receiver and the second receiver is small. In some exemplary embodiments of the present invention, switching to the first receiver implies also switching to the first transmitter, thereby causing a temporary loss of signal in both receivers.

Motivation to switch from the second receiver to the first receiver exists because the first receiver often receives more signal power, as described above, and thus, when the first receiver is operational, it often provides support for a higher data rate.

In some exemplary embodiments of the present invention, a smarter switching mechanism is implemented, using non binary quality detectors. The smarter switching mechanism uses a configurable parameter, denoted by Δ, which is a quality gain which is required for switching between systems.

Figure 6:
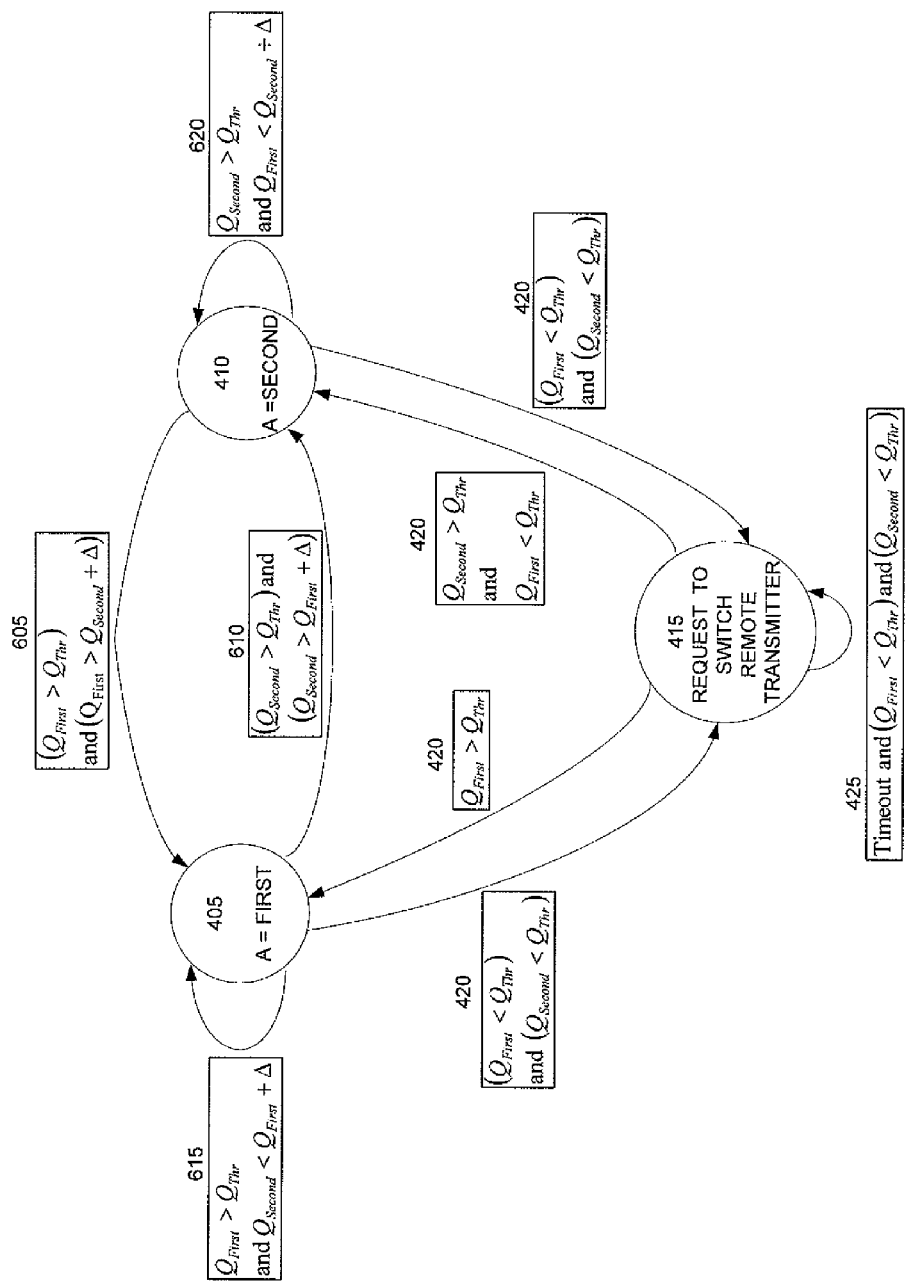
FIG. 6 is a state diagram of a protection controller in still another alternative exemplary embodiment of the system of FIG. 2A, with a smart switching mechanism providing a higher priority to a first receiver.

Reference is now made to FIG. 6, which is a state diagram of a protection controller in still another alternative exemplary embodiment of the system of FIG. 2A, with a smart switching mechanism providing a higher priority to a first receiver.

The protection controller of FIG. 6 preferably uses a multi-level quality detector.

The state diagram of FIG. 6 is similar to the state diagram of FIGS. 4 and 5, with the following changes, which are hereby described.

A transition 605 from the second receiver to the first receiver is made when the first receiver has a quality $Q_{first}$ above the threshold quality $Q_{thr}$, and the quality of the first receiver exceeds the quality of the second receiver $Q_{Second}$ by $\Delta$.

A transition 610 from the first receiver to the second receiver is made when the second receiver has a quality $Q_{Second}$ above the threshold quality $Q_{thr}$, and the quality of the second receiver also exceeds the quality of the first receiver $Q_{first}$ by $\Delta$.

State 405 of having a live first receiver is maintained, as denoted by a condition box 615, as long as both the first receiver has a quality $Q_{first}$ above the threshold quality $Q_{thr}$, and as long as the second receiver has a quality $Q_{Second}$ less than the quality of the first receiver $Q_{first}$ plus $\Delta$.

State 410 of having a live second receiver, is maintained, as denoted by a condition box 620, as long as both the second receiver has a quality $Q_{Second}$ above the threshold quality $Q_{thr}$, and as long as the first receiver has a quality $Q_{first}$ less than the quality of the second receiver $Q_{Second}$ plus $\Delta$.

It is expected that during the life of this patent many relevant devices and systems will be developed and the scope of the terms herein, particularly of the terms Adaptive Coding and Modulation (ACM), Mean Squared Error (MSE) estimator, coding and modulation unit, hard decisions, live system, main system, and backup system is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A protected point-to-point Adaptive Coding and Modulation (ACM) communication system comprising:
   at least a first component and a second component configured to provide live functionality and backup functionality for each other;
   at least a live receiver and a backup receiver configured to receive an ACM transmission;
   a quality detector configured to estimate quality of a received transmission of at least the backup receiver, using blind detection when a demodulator comprised in the backup receiver is not phase locked to the transmission received by the backup receiver; and
   a controller configured to switch the live functionality of the protected point-to-point ACM communication system from a live components to a backup component, based, at least partly, on the estimated quality of the received transmission of the backup receiver.

2. The protected ACM communication system according to claim 1 and wherein power of the received transmission is split equally between the live receiver and the backup receiver.

3. The protected ACM communication system according to claim 1 and wherein power of the received transmission is split unequally between the live receiver and the backup receiver.

4. The protected ACM communication system according to claim 1 and wherein the blind detection comprises a non-decision-directed mechanism.

5. The protected ACM communication system according to claim 4 and wherein the non-decision-directed mechanism comprises detecting whether the received transmission is modulated.

6. The protected ACM communication system according to claim 4 and wherein the non-decision-directed mechanism comprises detecting whether the received transmission has a Probability Distribution Function (PDF) of magnitudes of received symbols substantially equal to an expected PDF of magnitudes.

7. The protected ACM communication system according to claim 4 and wherein the non-decision-directed mechanism comprises a preamble detector.

8. The protected ACM communication system according to claim 4 and wherein the non-decision-directed mechanism comprises performing autocorrelation on the received transmission.

9. The protected ACM communication system according to claim 1 and wherein the estimated quality is a binary value.

10. The protected ACM communication system according to claim 1 and wherein the estimated quality is a multi-level value.

11. The protected ACM communication system according to claim 1 and wherein the quality detectors is configured to estimate quality based, at least partly, on the received transmission magnitude.

12. The protected ACM communication system according to claim 1 and wherein the first component and the second component include the live receiver and the backup receivers.

13. The protected ACM communication system according to claim 12 and wherein the quality detector is configured to estimate quality by performing valid signal detection on the received transmission.

14. The protected ACM communication system according to claim 12 and wherein the quality detector is configured to estimate quality by performing preamble detection on the received transmission.

15. The protected ACM communication system according to claim 12, and further comprising a first transmitter and a second transmitter configured to provide live functionality and backup functionality for each other, and wherein the controller is configured to switch the live functionality of the protected point-to-point ACM communication system from the live receiver to the backup receiver, and from one of the first transmitter and the second transmitter to another of the first transmitter and the second transmitter, based, at least partly, on estimated qualities of the received transmissions of at least the live receiver and the backup receiver.

16. The protected ACM communication system according to claim 1 and wherein the first component and the second component include transmitters.

17. The protected ACM communication system according to claim 1 and wherein the controller is configured to switch the live functionality of the point-to-point communication system to the first component whenever the result does not indicate that use of the second component is necessary.

18. The protected ACM communication system according to claim 1 and wherein the controller is configured to switch the live functionality of the point-to-point communication system from one of the first component and the second component to another, based, at least partly, on estimated qualities of the received transmissions of at least the first live receiver and the backup receiver indicating that the switch will be from a component providing less quality to a component providing more quality.

19. The protected ACM communication system according to claim 1 and wherein:
   the protected ACM communication system comprises at least one transmitter, the live receiver, and the backup receiver;
   the quality detectors, is configured to estimate quality of the functionality of at least the live receiver and the backup receiver in a decision directed manner; and
   an ACM coding/modulation scheme of a live one of the at least one transmitter is based, at least partly, on an indication of quality estimated for a one of the live receiver and the backup receiver which has a lower Signal to Noise Ratio (SNR).

20. A method for protecting a point-to-point Adaptive Coding and Modulation (ACM) communication system comprising:
   providing at least a first component and a second component configured to provide live functionality and backup functionality for each other;
   receiving an ACM transmission by at least a live receiver and a backup receiver;
   estimating quality of a received transmission of at least the live receiver and the backup receiver, wherein the estimating the quality of the received transmission of at least the backup receiver is performed using blind detection when a demodulator comprised in the backup receiver is not phase locked to the transmission received by the backup receiver; and
   switching the live functionality of the point-to-point ACM communication system from a live component a backup component, based, at least partly, on the estimated qualities of the received transmissions of at least the live receiver and the backup receiver.

21. A protected point-to-point Adaptive Coding and Modulation (ACM) communication system comprising:
   at least a first component and a second component configured to provide live functionality and backup functionality for each other in a wireless point-to-point communication system;
   at least a live receiver and a backup receiver configured to receive an ACM transmission;
   means for estimating quality of the received transmission of at least the live receiver and the backup receiver, in which estimating the quality of the backup receiver is performed using blind detection when a demodulator comprised in the backup receiver is not phase locked to the transmission received by the backup receiver; and
   means for switching the live functionality of the wireless point-to-point communication system from one of the first component and the second component to another of the first component and the second component, based, at least partly, on the estimated qualities of the received transmissions of at least the live receiver and the backup receiver.

* * * * *